United States Patent
Takahashi et al.

(10) Patent No.: US 9,644,642 B2
(45) Date of Patent: May 9, 2017

(54) AXIAL COMPRESSOR AND GAS TURBINE HAVING AXIAL COMPRESSOR

(71) Applicant: Mitsubishi Hitachi Power Systems, Ltd., Nishi-ku (JP)

(72) Inventors: Yasuo Takahashi, Mito (JP); Chihiro Myoren, Tokai (JP); Kohta Kawamura, Hitachinaka (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 871 days.

(21) Appl. No.: 13/905,315

(22) Filed: May 30, 2013

(65) Prior Publication Data

US 2013/0318973 A1 Dec. 5, 2013

(30) Foreign Application Priority Data

Jun. 1, 2012 (JP) .................................. 2012-126495

(51) Int. Cl.
*F01D 25/32* (2006.01)
*F04D 29/58* (2006.01)
(Continued)

(52) U.S. Cl.
CPC ......... *F04D 29/5846* (2013.01); *F01D 25/32* (2013.01); *F02C 3/30* (2013.01);
(Continued)

(58) Field of Classification Search
CPC .. F04D 29/5846; F04D 29/584; F04D 29/705; F04D 29/706; F04D 29/701;
(Continued)

(56) References Cited

U.S. PATENT DOCUMENTS 4,329,114 A * 5/1982 Johnston ................. F01D 11/24
415/116
5,297,386 A 3/1994 Kervistin
(Continued)

FOREIGN PATENT DOCUMENTS

CN 1701168 A 11/2005
CN 101144431 A 3/2008
(Continued)

OTHER PUBLICATIONS

Chinese Office Action issued in counterpart Chinese Application No. 201310210972.9 dated Jan. 21, 2015 (15 pages).
(Continued)

*Primary Examiner* — Steven Sutherland
(74) *Attorney, Agent, or Firm* — Crowell & Moring LLP (57) ABSTRACT

An axial compressor that can remove an attachment within a groove of a casing and recover an effect of suppressing stall on rotor blades, and a gas turbine provided with the axial compressor, are provided. The axial compressor includes a compressor body 6 and a sprayer 9 for spraying droplets in suction gas of the compressor body 6 so that the droplets are introduced into the compressor body 6 and evaporate. The compressor body 6 includes a casing 11, a rotor 12, rotor blades 13, and stator vanes 14. A groove 21 is formed in an inner circumferential surface of the casing 11 so as to be positioned around rotor blades 13 arranged on a front stage side. A purge system 23 is provided that supplies high-pressure air to the groove 21 through communication holes 22.

13 Claims, 9 Drawing Sheets

(51) Int. Cl.
*F04D 29/70* (2006.01)
*F02C 9/18* (2006.01)
*F02C 3/30* (2006.01)
*F02C 7/143* (2006.01)

(52) U.S. Cl.
CPC .............. *F02C 7/1435* (2013.01); *F02C 9/18* (2013.01); *F04D 29/706* (2013.01); *F05D 2260/212* (2013.01); *Y02T 50/675* (2013.01)

(58) Field of Classification Search
CPC ......... F04D 2260/602; F04D 2260/607; F04D 2260/608; F05D 2260/212; F02C 3/30; F02C 3/305; F02C 7/1435; F02C 9/18; F02C 9/52
USPC ............. 60/785, 782, 775, 795, 39.3, 39.26; 415/116, 169.1–169.2, 196.4, 176, 178
See application file for complete search history.

(56) References Cited

U.S. PATENT DOCUMENTS

| | | |
|---|---|---|
| 5,669,217 A | 9/1997 | Anderson |
| 6,389,799 B1 | 5/2002 | Hatamiya et al. |
| 6,398,518 B1 | 6/2002 | Ingistov |
| 2005/0019152 A1* | 1/2005 | Seitz ................... F01D 5/145 415/58.5 |
| 2005/0141991 A1* | 6/2005 | Frutschi ............. F04D 29/681 415/144 |
| 2007/0137214 A1* | 6/2007 | Zewde .................. F02C 9/18 60/782 |
| 2007/0274824 A1* | 11/2007 | Burdgick ............. F01D 5/145 415/169.1 |
| 2008/0250769 A1 | 10/2008 | Wagner et al. |
| 2012/0003085 A1* | 1/2012 | Agneray .......... F04D 27/0207 415/199.5 |

FOREIGN PATENT DOCUMENTS

| | | |
|---|---|---|
| JP | 61-3999 U | 1/1986 |
| JP | 2004-108379 A | 4/2004 |
| JP | 2009-236069 A | 10/2009 |
| JP | 2010-48213 A | 3/2010 |

OTHER PUBLICATIONS

Japanese Office Action issued in counterpart Japanese Application No. 2012-126495 dated Feb. 2, 2016 with English translation (nine pages).

\* cited by examiner

AXIAL COMPRESSOR AND GAS TURBINE HAVING AXIAL COMPRESSOR

BACKGROUND OF THE INVENTION

1. Field of the Invention

The present invention relates to an axial compressor that sprays a droplet in suction gas, and a gas turbine provided with the axial compressor.

2. Description of the Related Art

A gas turbine generally includes an axial compressor for compressing air, a combustor for mixing a fuel with the compressed air generated by the axial compressor and burning the fuel and the compressed air, and a turbine that is rotationally driven by combustion gas generated by the combustor. Increase in air temperature (or increase in temperature of suction air of the axial compressor), as in summer, reduces the density of the suction air and output of the gas turbine. To deal with this, a method for spraying droplets such as water droplets in the suction air of the compressor has been proposed (refer to, for example, JP-2010-48213-A).

When droplets are sprayed in the suction air of the compressor, the droplets evaporate on an air intake side of the compressor thereby depriving the air of heat. Thus, the temperature of the suction air is reduced, and the density of the suction air is increased. This inlet air cooling effect can improve the output of the gas turbine. Moreover, if the rate of spraying droplets is increased to, for example, 2% or more of a mass flow rate of the suction air to introduce droplets into the compressor (or the droplets that are not gasified on the air intake side of the compressor are introduced into the compressor), the droplets evaporate in the compressor, thereby depriving the air of heat. Thus, the temperature of air in the compressor is reduced. This intermediate cooling effect causes a compression characteristic to be close to isothermal compression, and reduces compression work. This enables the efficiency of the gas turbine to be improved.

As described above, when the droplets are introduced into the compressor and evaporate, a stage load on a front stage side (specifically, blade loading on the upstream side with respect to an evaporation completion position at which the droplets completely evaporate) is reduced, and a stage load on a rear stage side (specifically, blade loading on the downstream side with respect to the evaporation completion position) increases. It is, therefore, preferable that the compressor be designed such that the stage load on the front stage side is relatively high in expectation of the reduction in the stage load and the stage load on the rear stage side is relatively low in expectation of the increase in the stage load, so that an operation is to be optimized when droplets are sprayed in the suction air of the compressor (or when the droplets are introduced into the compressor). If, however, the compressor is designed in the aforementioned manner, when droplets are not sprayed in the suction air of the compressor (or the droplets are not introduced into the compressor), for example, upon activation of the gas turbine, a high load is applied to the blade cascade arranged on the front stage side. Further, in general, a high load is easily applied to the blade cascade arranged on the upstream side of the compressor during a low-speed rotation in an initial state of the activation of the gas turbine. For highly loaded rotor blades, a separation region may become larger due to interference of leaking flow occurred in a space between the rotor blades and a casing with a shock wave generated between the rotor blades. This raises a problem about a stall.

As a measure to suppress the stall on the highly loaded rotor blades, a casing treatment that has an annular groove (rectangular slit) formed in an inner circumferential surface of the casing so as to be positioned around the rotor blades has been disclosed (refer to, for example, JP-2009-236069-A). The groove suppresses the interference of the leaking flow occurred in the space between the rotor blades and the casing with the shock wave generated between the rotor blades.

SUMMARY OF THE INVENTION

If the casing treatment is used for the compressor into which droplets are introduced by spraying droplets in the suction air (or the groove is formed on the inner circumferential surface of the casing so as to be positioned around the rotor blades on the front stage side), the following problems arise.

Fine droplets, which flow with airflow among droplets introduced in the compressor, evaporate while passing through a space between rotor blades and a space between stator vanes. On the other hand, large droplets, which do not flow with the airflow, collide with rotor blades, stator vanes, and the like. Then, the droplets that collide with the rotor blades are blown to an outer side in a radius direction by centrifugal force caused by rotations of the rotor blades and reach the inner circumferential surface of the casing. Thus, droplets may be accumulated to be attached to the groove of the casing as a liquid membrane (drain). With the attachment of the liquid membrane in the groove of the casing, an impurity within the liquid membrane and an impurity (dust) within the atmosphere may be attached to the groove. Thus, if the compressor operates for a long time, the liquid membrane and the impurities may be attached to the groove of the casing, thereby reducing an effect of suppressing the stall on the rotor blades.

An object of the invention is to provide an axial compressor capable of removing an attachment within a groove of a casing and recovering an effect of suppressing a stall on rotor blades.

In order to accomplish the aforementioned object, according to the invention, an axial compressor includes a compressor body that compresses gas and a sprayer that sprays a droplet in the suction air of the compressor body so that the droplet is introduced into the compressor body and evaporates. The compressor body includes a casing, a rotor rotatably arranged in the casing, a plurality of rotor blades arranged on an outer circumferential side of the rotor, a plurality of stator vanes arranged on an inner circumferential side of the casing, a groove arranged in an inner circumferential surface of the casing so as to be positioned around rotor blades arranged on a front stage side. In the axial compressor, a communication hole communicating with the groove is formed in the casing, and a purge system for supplying high-pressure gas to the groove through the communication hole is provided so as to remove an attachment within the groove.

According to the invention, the purge system supplies high-pressure air to the groove through the communication hole of the casing, for an example, when droplets are not sprayed in the suction air of the compressor (or not introduced in the compressor) before stop of the compressor. It is, therefore, possible to remove attachments (specifically, a liquid membrane, an impurity, and the like) within the groove of the casing and recover the effect of suppressing the stall. Thus, it is possible to suppress the stall on the rotor blades upon activation of the compressor and stabilize the activation of the compressor. As a result, the reliability can be improved.

According to the invention, it is possible to remove attachments within the groove of the casing and recover the effect of suppressing the stall on the rotor blades.

DESCRIPTION OF THE PREFERRED EMBODIMENTS

A first embodiment of the invention is described with reference to FIGS. 1 to 6.

Figure 1:
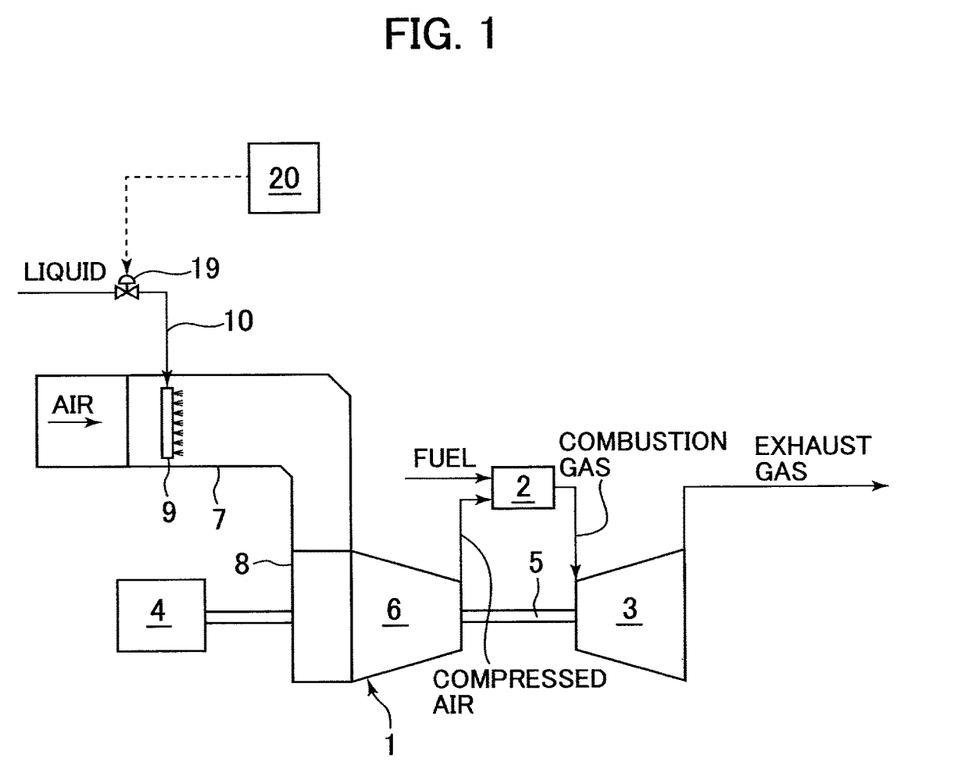
FIG. 1 is an outline diagram illustrating an overall configuration of a gas turbine according to a first embodiment of the invention.
Figure 2:
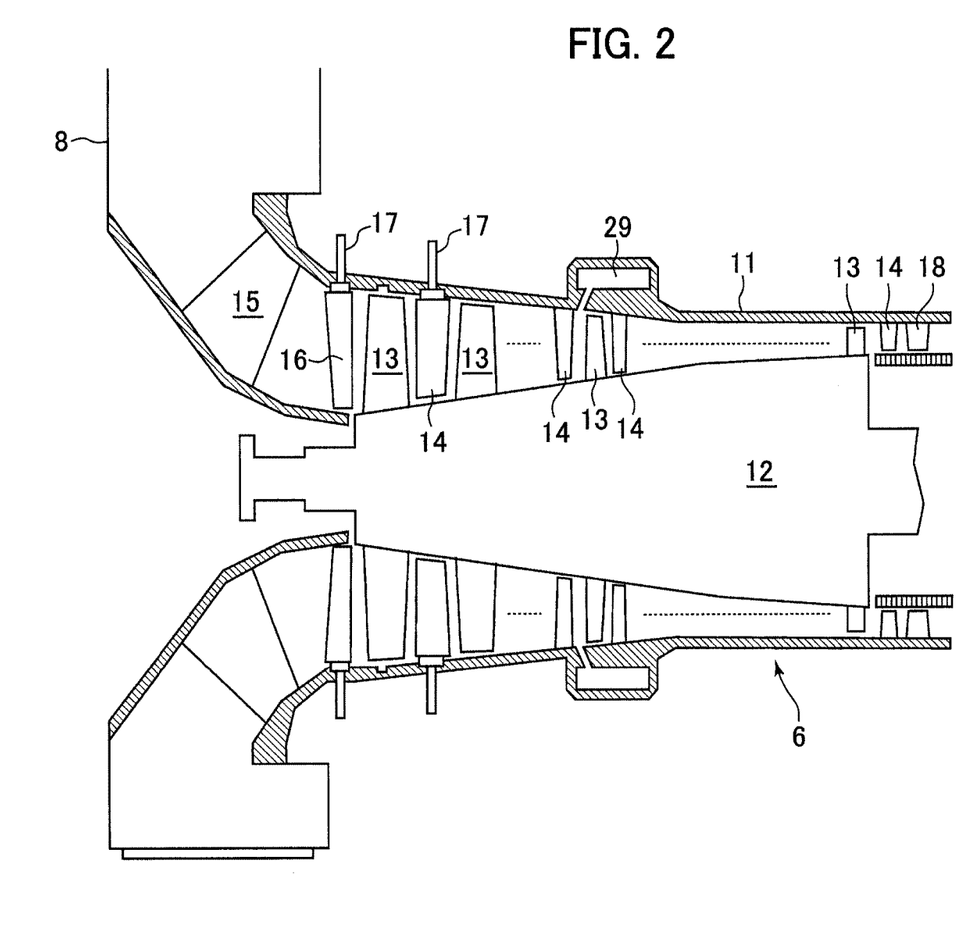
FIG. 2 is an axial-direction cross section view of a structure of an axial compressor according to the first embodiment of the invention.

FIG. 1 is an outline diagram illustrating an overall configuration of a gas turbine according to the first embodiment. FIG. 2 is an axial-direction cross section view of a structure of an axial compressor according to the first embodiment. In FIG. 2, a part of rotor blades and stator vanes is omitted and indicated by dotted lines.

The gas turbine according to the first embodiment includes an axial compressor 1, a combustor 2, a turbine 3, and a power generator 4. The axial compressor 1 compresses air (gas) serving as a working fluid. The combustor 2 mixes a fuel with the compressed air (compressed gas) generated by the compressor 1 and burns the fuel and the compressed air. The turbine 3 is rotationally driven by high-temperature combustion gas generated by the combustor 2. The power generator 4 is driven by rotational power of the turbine 3. The compressor 1, the turbine 3, and the power generator 4 are connected to each other through a rotary shaft 5. After causing the turbine 3 to rotate, the combustion gas is discharged as exhaust gas to the outside of a system.

The axial compressor 1 includes a compressor body 6, an intake air filter (not illustrated), an air intake duct 7, and an air inlet plenum 8. The compressor body 6 compresses air. The intake air filter, the air intake duct 7, and the air inlet plenum 8 are arranged on an air intake side of the compressor body 6. In addition, the axial compressor 1 also includes a sprayer 9 and a liquid supply system 10. The sprayer 9 is arranged in the air intake duct 7. The liquid supply system 10 supplies a liquid such as water to the sprayer 9. In the first embodiment, the sprayer 9 is arranged in the air intake duct 7, but may be arranged in the air inlet plenum 8 or in both air intake duct 7 and air inlet plenum 8.

The compressor body 6 includes a casing (stationary body) 11 and a rotor (rotating body) 12. The rotor 12 is rotatably arranged in the casing 11. A substantially circular main flow path (working fluid path) is formed between an inner circumferential surface of the casing 11 and an outer circumferential surface of the rotor 12. The compressor body 6 further includes rotor blades 13 and stator vanes 14. The rotor blades 13 are arranged on the outer circumferential side of the rotor 12, while the stator vanes 14 are arranged on the inner circumferential side of the casing 11. The rotor blades 13 arranged in a circumferential direction of the rotor 12 form a blade cascade. The stator vanes 14 arranged in a circumferential direction of the casing 11 form a vane cascade. The cascades of the rotor blades 13 and the cascades of the stator vanes 14 are alternately arranged in an axial direction (left-right direction in FIG. 2) while a pair of a cascade of the rotor blades 13 and a cascade of the stator vanes 14 form a single stage. In other words, the rotor blades 13 are arranged at a plurality of stages on the outer circumferential side of the rotor 12, while the stator vanes 14 are arranged at the plurality of stages on the inner circumferential side of the casing 11.

A strut 15 and an inlet guide vane (IGV) 16 are arranged on the upstream side of the rotor blades 13 arranged at the initial stage. The inlet guide vane 16 is a variable stator vane provided with a variable mechanism 17. The flow rate of suction air can be controlled by changing an angle of the inlet guide vane 16. Thus, a load of the gas turbine can be controlled by changing the angle of the inlet guide vane 16. In addition, the stator vanes 14 arranged at the initial stage (or the stator vanes 14 arranged at multiple stages on the upstream side, which include the stator vanes 14 arranged at the initial stage) are variable stator vanes that are each provided with a variable mechanism 17. Rotating stall upon activation of the gas turbine can be suppressed by changing angles of the stator vanes 14 arranged at the initial stage. In addition, an outlet guide vane 18 is arranged on the downstream side of the stator vanes 14 arranged at the last stage.

The sprayer 9 has a plurality of spraying nozzles that spray droplets such as water droplets in the suction air of the compressor body 6. Since the fine droplets evaporate to deprive the air of heat on the air intake side of the compressor body 6, the temperature of the suction air is reduced and the density of the suction air is increased (inlet air cooling effect). Thus, the output of the gas turbine is improved. In addition, the sprayer 9 introduces droplets into the compressor body 6 while the rate of spraying droplets from the sprayer 9 is 2% or more of the mass flow rate of the suction air. Thus, as the droplets that are introduced in the compressor body 6 evaporate to deprive the air of heat, the temperature of the compressing air is reduced (intermediate cooling effect). This intermediate cooling effect causes a compression characteristic to be close to isothermal compression, reduces compression work, and improves the efficiency of the gas turbine. The droplets that are introduced in the compressor body 6 completely evaporate until the droplets reach a discharge side of the compressor body 6.

As described above, when droplets are introduced into the compressor body 6 and evaporate, a stage load on the front stage side (or a blade loading on the upstream side with respect to an evaporation completion position at which the droplets completely evaporate in the compressor body 6) is reduced, and a stage load on the rear stage side (or a blade loading on the downstream side with respect to the evaporation completion position) is increased. Thus, in the first embodiment, the compressor is designed such that the stage load on the front stage side is to be relatively high in expectation of the reduction in the stage load and the stage load on the rear stage side is to be relatively low in expectation of the increase in the stage load, so that an operation is to be optimized when droplets are sprayed in the suction air of the compressor body 6 (or introduced into the compressor body 6). Details of the stage loads are described with reference to FIGS. 3 and 4.

Figure 3:
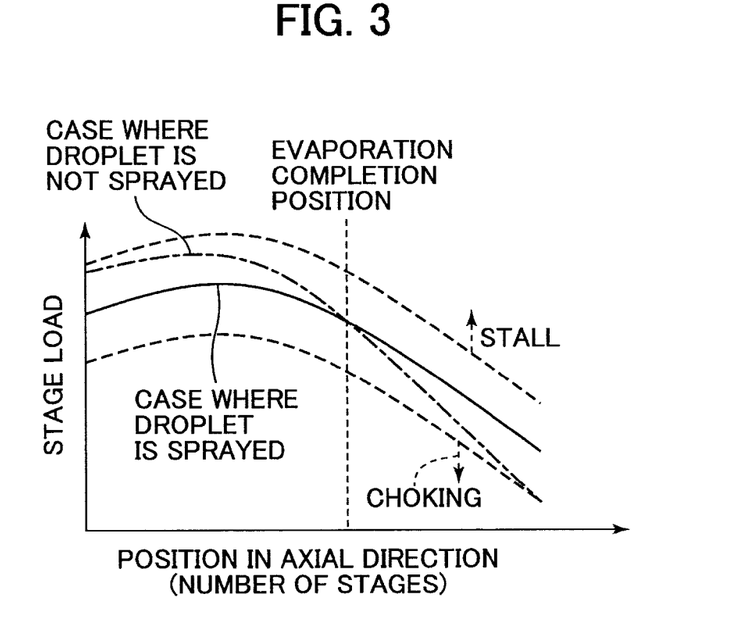
FIG. 3 is a diagram illustrating axial-direction distributions of stage loads of the axial compressor according to the first embodiment of the invention.
Figure 4:
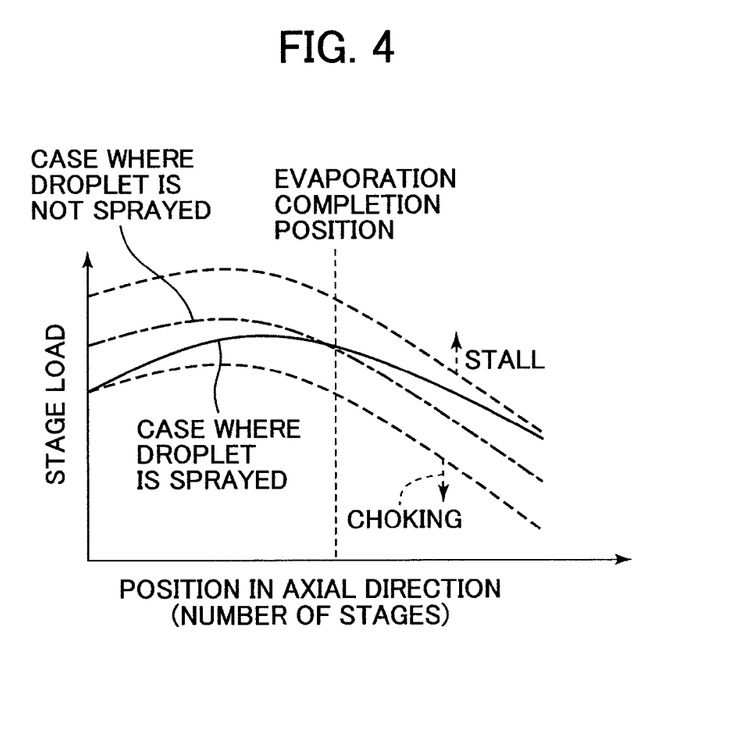
FIG. 4 is a diagram illustrating axial-direction distributions of stage loads of a general axial compressor according to a comparative example.

FIG. 3 is a diagram illustrating axial-direction distributions of stage loads of the axial compressor according to the first embodiment. FIG. 4 is a diagram illustrating axial-direction distributions of stage loads of a general axial compressor according to a comparative example. In each of FIGS. 3 and 4, the abscissa indicates a position (number of stages) in the compressor in the axial direction, and the ordinate indicates a load (stage load) to be applied to a stage.

As indicated by an alternate long and short dashed line in FIG. 4, the general axial compressor is designed such that a stall and choking hardly occur and blade cascades arranged at all stages efficiently operate during a rated operation on the assumption that droplets are not sprayed in the suction air of the compressor (or not introduced into the compressor). Specifically, the general axial compressor is designed such that the stage loads are in a range from a lower line obtained by adding a certain margin to a limit line on a choking side (low-load side) to an upper line obtained by subtracting the certain margin from a limit line on a stall side (high-load side).

For example, if a stage load reaches the limit line on the choking side, a probability that a separation occurs on a pressure surface side of a blade cascade increases. Further, if the stage load reaches the limit line on the stall side, a probability that a separation occurs on a negative pressure surface side of a blade cascade increases. If the separation occurs, the performance (specifically, a pressure ratio, the efficiency, and the like) of the compressor is reduced. Especially, if the stage load reaches the limit line on the stall side and the separation occurs on the negative pressure surface side of the blade cascade, a rotating stall occurs and surging may occur. An increase in the margin of the stage loads for the limit line on the stall side increases a surge margin that is a margin for the occurrence of the surging.

As indicated by a solid line in FIG. 4, in the general axial compressor, when droplets are sprayed in the suction air of the compressor (or introduced into the compressor), a stage load on the front stage side (specifically, a blade loading on the upstream side with respect to the evaporation completion position) is reduced and a stage load on the rear stage side (specifically, a blade loading on the downstream side with respect to the evaporation completion position) is increased. Thus, a probability of occurrence of a stall increases on a blade cascade located on the rear stage side. Specifically, the surge margin may be reduced and surging may occur. Especially, when the amount of sprayed droplets is large, the decrease rate of the surge margin is large and a probability of occurrence of the surging increases.

As indicated by a solid line in FIG. 3, the axial compressor according to the present embodiment is designed such that a stall and choking hardly occur and blade cascades arranged at all the stages efficiently operate during a rated operation while droplets are sprayed in the suction air of the compressor (or introduced into the compressor). Specifically, the compressor is designed such that the stage load on the front stage side is relatively high in expectation of the reduction in the stage load upon the spraying of the droplets and the stage load on the rear stage side is relatively low in expectation of the increase in the stage load upon the spraying of the droplets. As indicated by an alternate long and short dashed line in FIG. 3, a high load is applied to the rotor blades arranged on the front stage side when droplets are not sprayed in the suction air of the compressor (or not introduced into the compressor).

Returning to FIG. 1, the liquid supply system 10 includes a flow rate control valve 19, and a control device 20 variably controls an opening degree of the flow rate control valve 19. In the present embodiment, when the gas turbine is activated and reaches a rated load operation, the control device 20 switches the state of the flow rate control valve 19 from a closed state to an open state so as to cause the sprayer 9 to start spraying droplets. This is due to the fact that since a blade loading on the downstream side of the compressor body 6 increases during a partially loaded operation of the gas turbine in general, if droplets are introduced into the compressor body 6 under the condition, the blade loading on the downstream side further increases and the surge margin is reduced. In addition, for the same reason, the control device 20 switches the state of the flow rate control valve 19 from the open state to the closed state so as to cause the sprayer 9 to stop spraying droplets during the rated load operation before stop of the gas turbine.

When droplets are not sprayed in the suction air of the compressor body 6 (or not introduced into the compressor body 6), for example, upon the activation of the gas turbine, a high load is applied to the rotor blades 13 arranged on the front stage side as described above. A region in which a separation occurs may become larger due to interference of leaking flow occurred in a space between the highly loaded rotor blades 13 and the casing 11 with a shock wave generated between the highly loaded rotor blades 13, and a probability of occurrence of a stall increases. Especially, since a stall on the rotor blades 13 arranged at the initial stage largely affects the downstream side, problems about occurrence of rotating stall, surging and the like increase as well as a problem about reduction in efficiency of the compressor 1.

Figure 5:
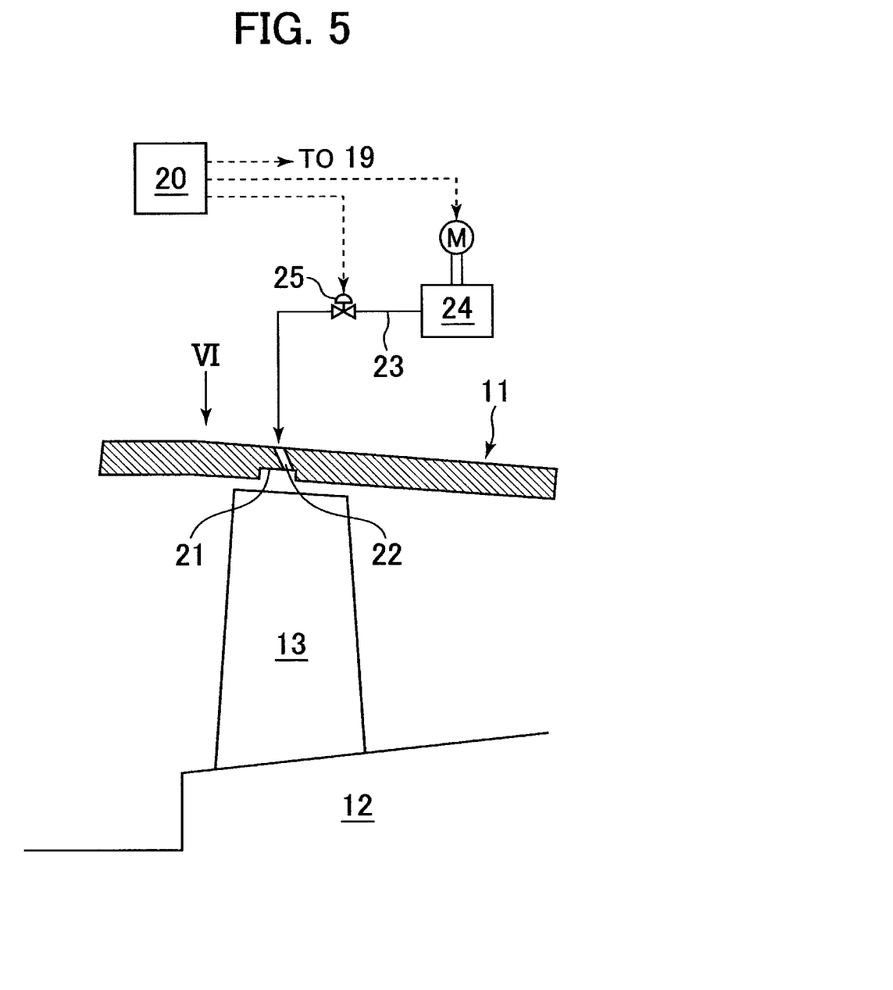
FIG. 5 is a diagram illustrating a groove and communication hole of a casing of the axial compressor according to the first embodiment of the invention, accompanying with a purge system, and a control device.
Figure 6:
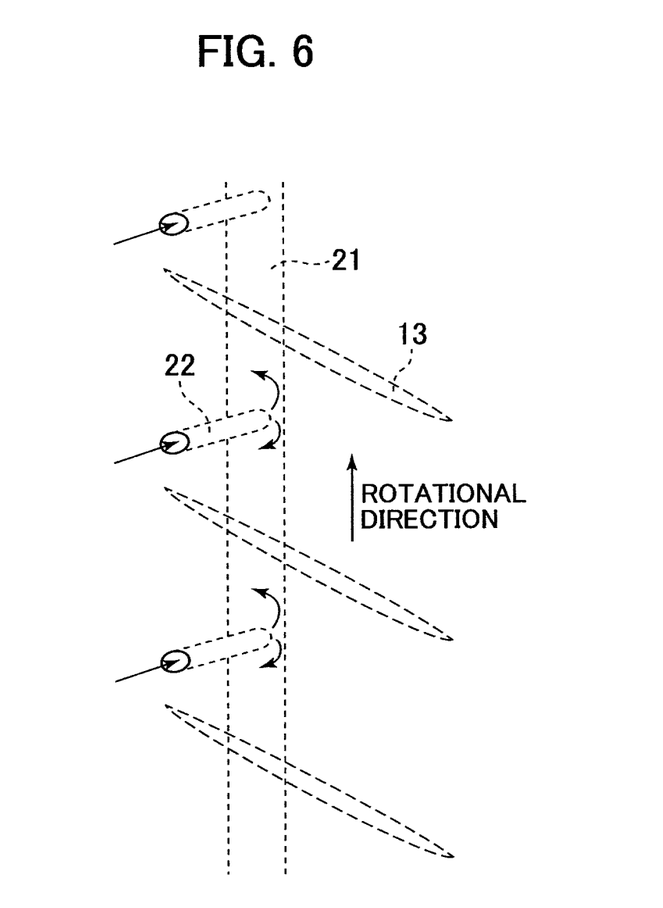
FIG. 6 is a plan view of the axial compressor when the axial compressor is viewed from a direction of an arrow VI of FIG. 5.

As illustrated in FIGS. 5 and 6, in the present embodiment, an annular groove 21 is formed in the inner circumferential surface of the casing 11 so as to be positioned around rotor blades 13 arranged at the first stage. The groove 21 suppresses the interference of the leaking flow occurred in the space between the rotor blades 13 arranged at the initial stage and the casing 11 with the shock wave generated between the rotor blades 13 and suppresses a stall of the rotor blades 13 arranged at the initial stage.

When droplets are sprayed in the suction air of the compressor body 6 (or introduced into the compressor body 6), as in a rated load operation of the gas turbine, a liquid membrane or an impurity may be attached to the groove 21 of the casing 11. Specifically, fine droplets, which flow with airflow among the droplets introduced in the compressor body 6, evaporate while passing through a space between the rotor blades 13 and a space between stator vanes 14. On the other hand, large droplets (specifically, large droplets generated by interference of the droplets or large droplets generated by scattering of a part of a liquid membrane formed by droplets attached to the strut 15 or to the inlet guide vane 16), which do not flow with the airflow, collide with the rotor blades 13 arranged at the initial stage or the like. Then, the droplets that collide with the rotor blades 13 arranged at the initial stage are blown to the outer side in a radius direction by centrifugal force caused by rotations of the rotor blades 13 and reach the inner circumferential surface of the casing 11. Thus, droplets may be accumulated to be attached to the groove 21 of the casing 11 as a liquid membrane (drain). With the attachment of the liquid membrane in the groove 21 of the casing, an impurity within the liquid membrane and an impurity (dust) within the atmosphere may be attached. Thus, with a long-term operation of the gas turbine, an effect of suppressing a stall on the rotor blades 13 arranged at the initial stage is reduced, since the liquid membrane or impurities are attached to the groove 21 of the casing 11 of the compressor body 6.

In the present embodiment, as illustrated in FIGS. 5 and 6, a plurality of communication holes 22 are formed in the casing 11. The plurality of communication holes 22 open on an outer circumferential surface of the casing 11 and communicate with the groove 21. Further, in order to remove attachments (specifically, a liquid membrane and an impurity) within the groove 21, a purge system 23 that supplies high-pressure air to the groove 21 through the communication holes 22 is provided.

The purge system 23 has a purge compressor 24 and supplies the high-pressure air (specifically, air with higher pressure than the compressed air present near the rotor blades 13 arranged at the initial stage) generated by the purge system 24 to the groove 21 through the communication holes 22. The purge system 23 also has a purge control valve 25 whose opening and closing motions are controlled by the control device 20.

As described above, the control device 20 causes the sprayer 9 to stop spraying droplets during the rated load operation before the stop of the gas turbine (or in the state in which a rated load is applied while a rated speed is maintained). After that, the rated load operation is changed to a no-load operation (specifically, a state in which a load is not applied while the rated speed is maintained). Then, the purge compressor 24 is driven, the purge control valve 25 is changed from the closed state to the open state, and the high-pressure air is supplied from the purge system 23 to the groove 21 through the communication holes 22 (purge control).

The plurality of communication holes 22 are arranged at predetermined intervals in a circumferential direction of the casing 11. In the present embodiment, the communication holes 22 have a circular cross section as illustrated in FIG. 6. In the present embodiment, each of the communication holes 22 is arranged for each of spaces between the rotor blades 13 as illustrated in FIG. 6. A plurality of the communication holes 22 may be arranged for each of spaces between the rotor blades 13.

As illustrated in FIG. 5, the communication holes 22 are inclined toward the downstream side (right side in FIG. 5) with respect to the axial direction of the compressor body 6 and extend to the groove 21. Thus, the high-pressure air can be supplied to a downstream-side side surface of the groove 21 through the communication holes 22. Thus, an attachment that is easily attached to the downstream-side side surface of the groove 21 due to main flow within the compressor body 6 can be efficiently removed. In addition, the flow of the high-pressure air can hit the downstream-side side surface of the groove 21 so as to enable a swirling flow (or turbulence of the flow) to be formed in the groove 21 and enable attachments within the groove 21 to be efficiently removed from the groove 21.

As illustrated in FIG. 6, the communication holes 22 are inclined in the rotational direction (bottom-to-top direction in FIG. 6) and extend to the groove 21. Thus, the flow of the high-pressure air supplied to the groove 21 through the communication holes 22 and the leaking flow at ends of the rotor blades 13 interact with each other and can efficiently remove attachments within the groove 21. If the communication holes 22 are inclined toward the reverse direction (lower side in FIG. 6) of the rotation of the rotor blades 13, the flow of the high-pressure air supplied to the groove 21 through the communication holes 22 and the leaking flow at the ends of the rotor blades 13 interfere with each other and may cause fluid exciting at the rotor blades 13 arranged at the initial stage. This adverse effect can be avoided in the present embodiment.

In the present embodiment, when droplets are not sprayed in the suction air of the compressor body 6 (or not introduced into the compressor body 6) before the stop of the gas turbine (or before the stop of the compressor 1), the purge system 23 supplies the high-pressure gas to the groove 21 through the communication holes 22 of the casing 11 (purge control). This makes it, therefore, possible to remove attachments (specifically, a liquid membrane and an impurity) within the groove 21 of the casing 11 and recover the effect of suppressing the stall on the rotor blades 13 arranged at the initial state. Thus, the stall on the rotor blades 13 arranged at the initial state upon the activation of the gas turbine (or the activation of the compressor 1) can be suppressed, and the activation of the gas turbine (or the activation of the compressor 1) can be stabilized. As a result, the reliability can be improved.

In the present embodiment, since the purge control is executed during the no-load operation before the stop of the gas turbine (or in the state in which a load is not applied while the rated speed is maintained), a droplet and an impurity that are blown from the groove 21 of the casing 11 can be removed, unlike the case where the purge control is executed after the stop of the gas turbine. Specifically, this is as follows. If the purge control is executed after the stop of the gas turbine, droplets and impurities, which are blown from the groove 21 of the casing 11, are highly likely to be attached to the stator vanes 14 arranged on the downstream side and the rotor blades 13 arranged on the downstream side. If an impurity is attached to any of the stator vanes 14 arranged on the downstream side and the rotor blades 13 arranged on the downstream side, the efficiency of the compressor 1 and the surge margin may be reduced. In the present embodiment, however, since the gas turbine operates at the rated speed (or the flow rate is high), a droplet and an impurity that are blown from the groove 21 can be removed for a short time, and an attachment to the stator vanes 14 arranged on the downstream side and the rotor blades 13 arranged on the downstream side can be suppressed. In addition, the amount of a fuel to be consumed can be reduced, compared with the case where the purge control is executed during the rated load operation before the stop of the gas turbine (or in the state in which the rated load is applied while the gas turbine operates at the rated speed). During the no-load operation of the gas turbine, the temperature of gas to be discharged from the compressor body 6 is 200° C. or higher, and a droplet blown from the groove 21 can be completely evaporated in the compressor body 6.

The first embodiment describes the example in which the communication holes 22 are inclined toward the downstream side (right side in FIG. 5) with respect to the axial direction of the compressor body 6 and inclined in the rotational direction (bottom-to-top direction in FIG. 6) of the rotor blades 13. The communication holes 22, however, are not limited to this and may be modified without departing from the spirit and technical ideas of the invention. For example, the communication holes 22 may not be inclined although the effect of removing attachments from the groove 21 is reduced. In this modified example, the effect described above can be obtained.

In addition, the first embodiment describes the example in which the communication holes 22 have the circular cross section as illustrated in FIG. 6. The communication holes 22, however, are not limited to this. The communication holes 22 may have a rectangular cross section or an elliptical cross section. In addition, an annular manifold (not illustrated) may be formed on the outer circumferential side of the casing 11, the plurality of communication holes 22 may extend between the manifold and the groove 21 and communicate with the groove 21, and the purge system 23 may supply the high-pressure air to the groove 21 through the manifold and the communication holes 22. In this modified example, an effect that is the same as the effect described above can be obtained.

A second embodiment of the invention is described with reference to FIG. 7. In the second embodiment, a suction system 26 is added. In the second embodiment, parts that are the same as those described in the first embodiment are indicated by the same reference numerals as the first embodiment, and a description thereof is omitted.

Figure 7:
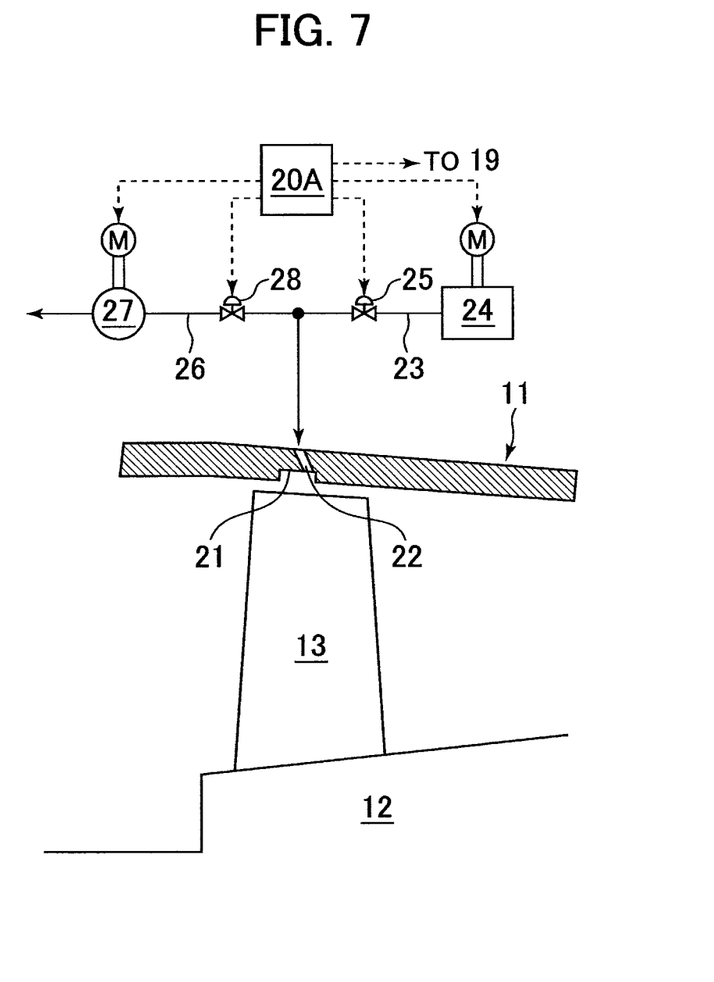
FIG. 7 is a diagram illustrating a groove and communication hole of a casing of an axial compressor according to a second embodiment of the invention, accompanying with a purge system, a suction system, and a control device.

FIG. 7 is a diagram illustrating the groove 21 and communication hole 22 of the casing 11 of an axial compressor according to the second embodiment, accompanying with the purge system 23, the suction system 26, and a control device 20A.

In the second embodiment, the suction system 26 that suctions attachments within the groove 21 through the communication holes 22 is arranged as well as the purge system 23. The suction system 26 has a vacuum pump 27 and suctions attachments within the groove 21 through the communication holes 22 by suction force generated by the vacuum pump 27. The suction system 26 also has a suction control valve 28 whose opening and closing motions are controlled by the control device 20A.

When the gas turbine is activated and reaches the rated load operation, the control device 20A causes the sprayer 9 to start spraying droplets. After that, at set time intervals, the control device 20A causes the vacuum pump 27 to drive, the suction control valve 28 to switch from the closed state to the open state, and the suction system 26 to suction an attachment within the groove 21 (suction control).

In addition, the control device 20A causes the sprayer 9 to stop spraying droplets during the rated load operation (or in the state in which the rated load is applied while the rated speed is maintained) before the stop of the gas turbine in the same manner as the control device 20 according to the first embodiment. After that, the operation is changed to the no-load operation (or the state in which a load is not applied while the rated speed is maintained). Then, the purge compressor 24 is driven, the purge control valve 25 is changed from the closed state to the open state, and the purge system 23 supplies the high-pressure air to the groove 21 (purge control).

In the present embodiment, the suction system 26 suctions attachments within the groove 21 through the communication holes 22 of the casing 11 while droplets are sprayed in the suction air of the compressor body 6 (or introduced into the compressor body 6) during the operation of the gas turbine (or during the operation of the compressor 1). In addition, the purge system 23 supplies the high-pressure gas to the groove 21 through the communication holes 22 of the casing 11 while droplets are not sprayed in the suction air of the compressor body 6 (or not introduced in the compressor body 6) before the stop of the gas turbine (or before the stop of the compressor 1) in the same manner as the first embodiment. Thus, an attachment within the groove 21 of the casing 21 can be removed, and the effect of suppressing the stall on the rotor blades 13 arranged at the initial state can be recovered. It is, therefore, possible to suppress the stall on the rotor blades 13 arranged at the initial stage upon the activation of the gas turbine (or the activation of the compressor 1) and stabilize the activation of the gas turbine (or the activation of the compressor 1). As a result, the reliability can be improved.

In the present embodiment, since the suction system 26 suctions a liquid membrane attached to the groove 21 of the casing 11 while droplets are sprayed in the suction air of the compressor body 6 during the operation of the gas turbine, erosion of the stator vanes 14 arranged on the downstream side and the rotor blades 13 arranged on the downstream side can be suppressed. As described above, when droplets are sprayed in the suction air of the compressor body 6, droplets may be accumulated to be attached to the groove 21 of the casing 11 as a liquid membrane over time during the operation. Further, a part of the liquid membrane formed in the groove 21 of the casing 11 may be split, scatter while forming a large droplet, collide with the stator vanes 14 arranged on the downstream side and the rotor blades 13 arranged on the downstream side, and may accelerate the erosion. In addition, the liquid membrane formed in the groove 21 of the casing 11 may interfere with the rotations of the rotor blades 13 and increase motive power. In the present embodiment, since the suction system 26 suctions the liquid membrane attached to the groove 21 of the casing 11, it is possible to suppress splitting of the liquid membrane attached to the groove 21 and scattering of the liquid membrane as a large droplet, and to suppress the erosion. In addition, it is possible to suppress the increase in motive power.

In the present embodiment, the communication holes 22 are inclined toward the downstream side (right side in FIG. 7) with respect to the axial direction of the compressor body 6 and extend to the groove 21 in the same manner as the first embodiment. Thus, an attachment that is easily attached to the downstream-side side surface of the groove 21 due to the main flow within the compressor body 6 can be efficiently suctioned and removed.

Figure 8:
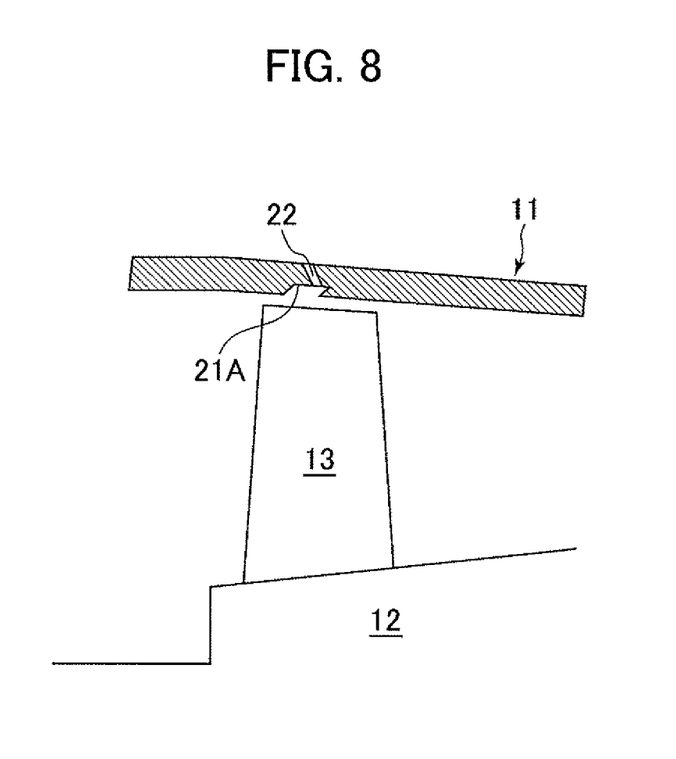
FIG. 8 is a diagram illustrating a groove and communication hole of a casing of an axial compressor according to a modified example of the invention.

The second embodiment describes the example in which the groove 21 of the casing 11 has a rectangular cross section (or an upstream-side side surface and the downstream-side side surface of the groove 21 are not inclined) as illustrated in FIG. 7. The groove, however, is not limited to this. For example, as illustrated in FIG. 8, an upstream-side side surface and downstream-side side surface of a groove 21A may be inclined toward the downstream side (right side in FIG. 8) in a depth direction (upward direction in FIG. 8) of the groove. In this modified example, it is possible to suppress splitting and scattering of a droplet from a liquid membrane that is easily attached to the downstream-side side surface of the groove 21A due to the main flow within the compressor body 6.

Figure 9:
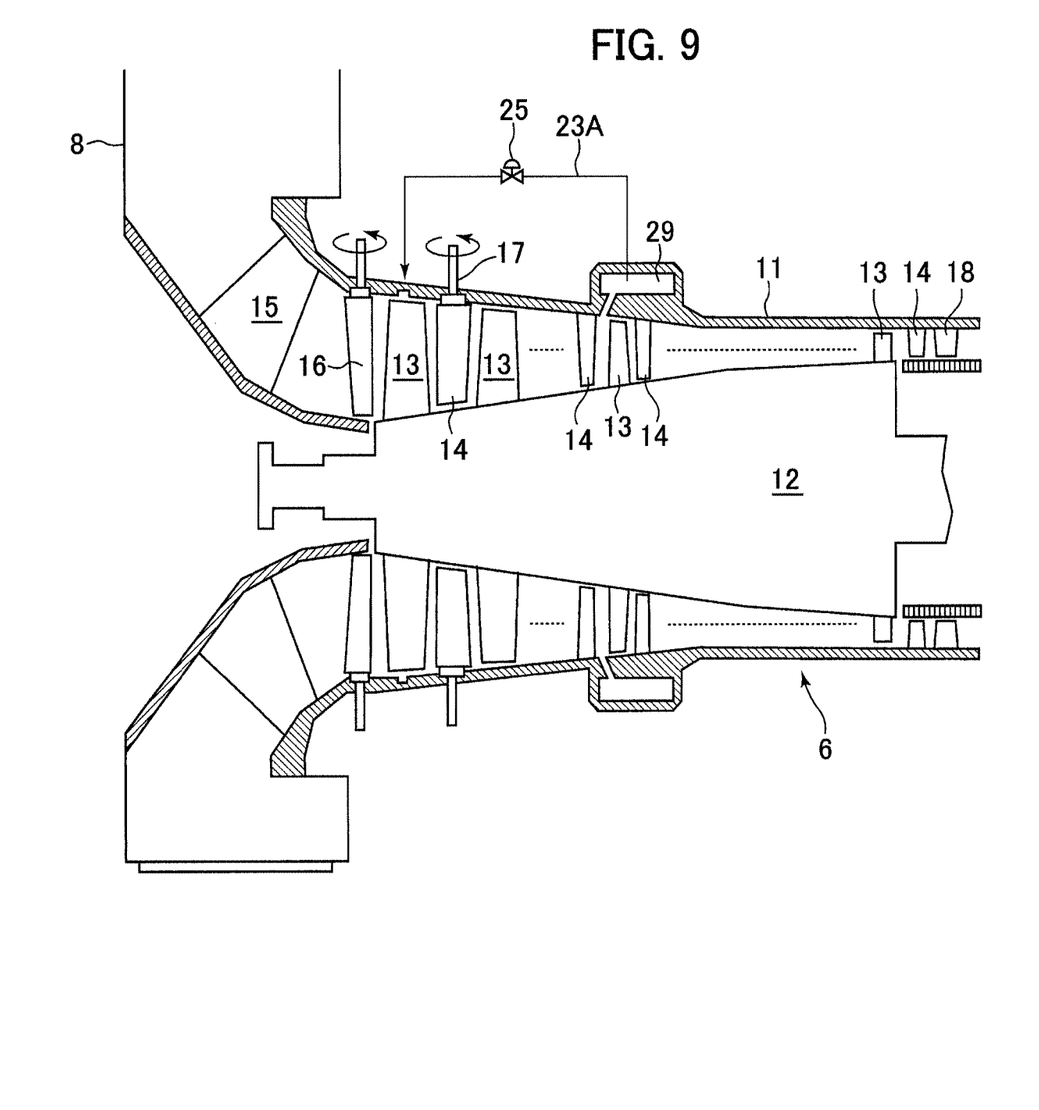
FIG. 9 is a diagram illustrating a purge system according to another modified example of the invention, accompanying with a structure of the axial compressor.

The first and second embodiments describe the example in which the purge system 23 supplies the high-pressure air generated by the purge compressor 24 to the groove 21 through the communication holes 22 as illustrated in FIGS. 5 and 7. The purge system, however, is not limited to this and may be modified without departing from the spirit and technical ideas of the invention. For example, as illustrated in FIG. 9, the compressor body 6 may include an air extractor 29 for extracting air from a space between the stator vanes 14 and the rotor blades 13, which are arranged on the downstream side with respect to the evaporation completion position. A purge system 23A (purge path) may be arranged, which supplies the compressed air (specifically, the air with higher pressure than the compressed air present near the rotor blades 13 arranged at the initial stage) extracted by the air extractor 29 of the compression body 6 to the groove 21 through the communication holes 22. In this modified example, the purge compressor 24 and auxiliary parts (specifically, a filter for suppressing introduction of a foreign substance, a drain separator, and the like) are not necessary, and there are advantages regarding the operability, the arrangement, and the cost.

The first and second embodiments and the modified examples describe the example in which the single groove 21 is formed so as to correspond to the rotor blades 13 arranged at the initial stage. The groove structure, however, is not limited to this and may be modified without departing the spirit and technical ideas of the invention. Specifically, a plurality of grooves 21 may be formed so as to correspond to the rotor blades 13 arranged at multiple stages on the upstream side with respect to the evaporation completion position. A plurality of communication holes 22 may be formed for each of the grooves 21, and the purge system 23 may supply the high-pressure air to the plurality of grooves 21 through the communication holes 22. In addition, the suction system 26 may suction attachments within the grooves 21 through the communication holes 22. In this modified example, an effect that is the same as the effect described above can be obtained.

A third embodiment of the invention is described with reference to FIG. 10. In the third embodiment, an advanced humid air gas turbine is used. In the third embodiment, parts that are the same as those described in the first and second embodiments and the modified examples are indicated by the same reference numerals as the first and second embodiments and the modified examples, and a description thereof is omitted.

Figure 10:
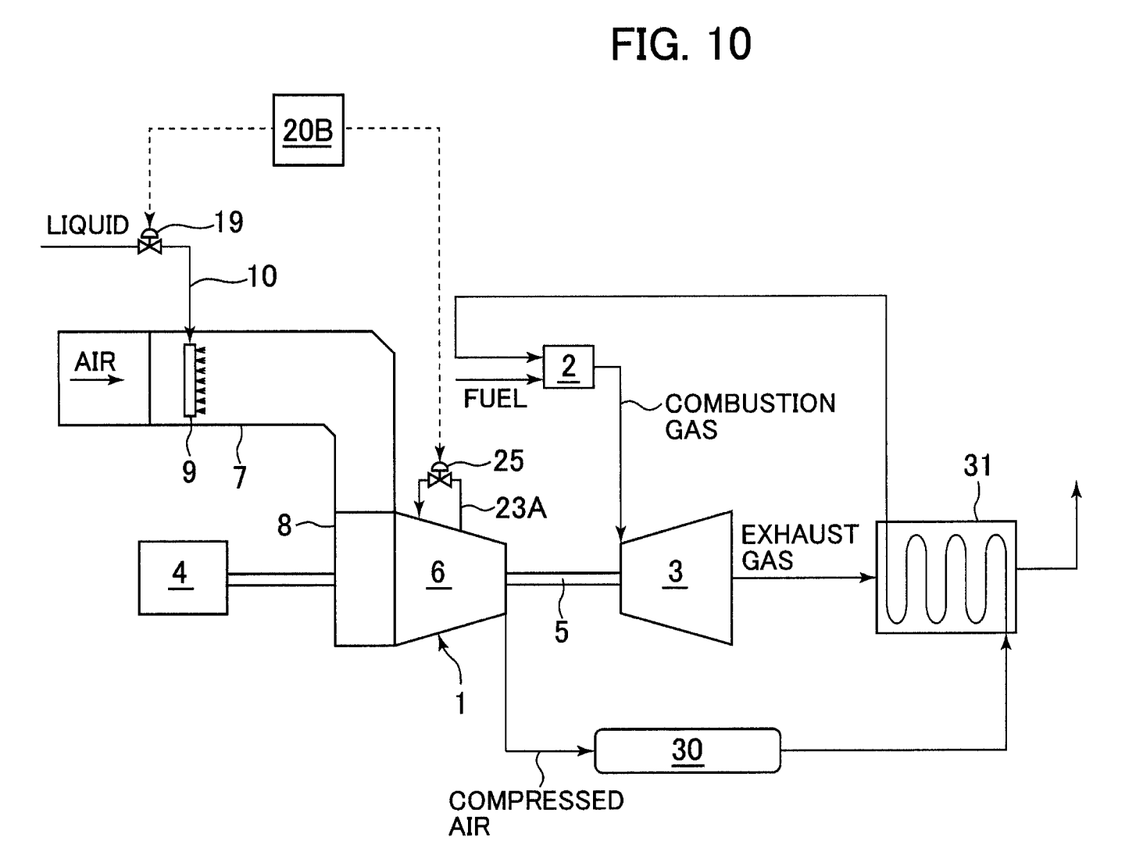
FIG. 10 is an outline diagram illustrating an overall configuration of a gas turbine according to a third embodiment of the invention.

FIG. 10 is an outline diagram illustrating an overall configuration of the gas turbine according to the third embodiment.

The gas turbine according to the third embodiment includes the axial compressor 1, the combustor 2, the turbine 3, a humidifier 30, and a recuperator 31. The humidifier 30 humidifies the compressed air generated by the axial compressor 1. The recuperator 31 heats the compressed air (highly humid air) humidified by the humidifier 30 by heat exchange with the exhaust gas of the gas turbine 3. The combustor 2 mixes the fuel with the compressed air heated by the recuperator 31 and burns the fuel and the compressed air. The exhaust gas of the turbine 3 is subjected to heat recovery by the recuperator 31 and discharged to the outside of the system.

The advanced humid air gas turbine recovers energy of the exhaust gas of the turbine 3 to use for the compressed air for burning. Thus, the flow rate of the fuel of the combustor 2 can be reduced, and the efficiency of the gas turbine can be improved. In addition, since the humidity of the compressed air is increased by the humidifier 30 or the mass flow rate of the working fluid is increased, the output of the gas turbine can be improved. Furthermore, since the amount of heat recovered by the recuperator 31 is increased by increasing the mass flow rate of the compressed air by the humidifier 30 and reducing the temperature of the compressed air, the efficiency of the gas turbine can be further improved.

For the advanced humid air gas turbine, pressure loss in a compressed air system ranging from the compressor 1 to the combustor 2 (specifically, the compressor 1→the humidifier 30→the recuperator 31→the combustor 2) is large, as compared with a gas turbine generally used. This means that the high pressure side receives the compression ratio for the whole compressor 1. Accordingly, a stall is likely to occur on the rotor blades 13 arranged on the front stage side upon activation of the gas turbine, which raises a problem with a rotating stall.

In the present embodiment, the annular groove 21 is formed in the inner circumferential surface of the casing 11 so as to be positioned around the rotor blades 13 arranged on the front stage side in the same manner as the first embodiment. In addition, the casing 11 has the plurality of communication holes 22 that communicate with the groove 21 in the same manner as the first embodiment. Furthermore, the purge system 23A that supplies the high-pressure air to the groove 21 through the plurality of communication holes 22 is arranged in the same manner as the above modified example illustrated in FIG. 9. The purge system 23A supplies the compressed air extracted by the air extractor 29 of the compressor body 6 to the groove 21 through the communication holes 22. The purge system 23A has the purge control valve 25 whose opening and closing motions are controlled by a control device 20B.

Operations that are executed before the stop of the gas turbine according to the present embodiment are described below. First, the control device 20B switches the state of the flow rate control valve 19 from the open state to the closed state to cause the sprayer 9 to stop spraying droplets during the rated load operation of the gas turbine (that is, in the state in which a rated load is applied while a rated speed is maintained). After that, the control device 20B switches, from an open state to a closed state, a flow rate control valve (not illustrated) of a system for supplying a liquid to the humidifier 30 in order to cause the humidifier 30 to stop humidifying the compressed air. Then, the operation is maintained until the output of the gas turbine is stabilized after the stop of the humidifier 30. In this case, the state of the purge control valve 25 is changed from the closed state to the open state, and whereby the purge system 23A supplies the high-pressure air to the groove 21. This enables attachments (specifically, a liquid membrane and an impurity) within the groove 21 of the casing 11 to be removed, whereby the effect of suppressing the stall on the rotor blades 13 arranged at the initial stage can be recovered. Then, when the output of the gas turbine is stabilized and the attachments are completely removed, a flow rate control valve (not illustrated) that is included in a system for supplying a fuel to the combustor 2 is changed from an open state to a closed state, whereby the combustor 2 stops burning. As a result, the gas turbine stops.

In the configuration according to the present embodiment, attachments within the groove 21 of the casing 11 can be removed and the effect of suppressing the stall on the rotor blades 13 arranged on the front stage side can be recovered before the stop of the gas turbine (or before the stop of the compressor 1), like the first embodiment. It is, therefore, possible to suppress the stall on the rotor blades 13 arranged on the front stage side upon the activation of the gas turbine (or the activation of the compressor 1) and stabilize the activation of the gas turbine (or the activation of the compressor 1). As a result, the reliability can be improved.

The third embodiment describes the example in which the purge system 23A supplies the compressed air extracted by the air extractor 29 of the compressor body 6 to the groove 21 through the communication holes 22 in the same manner as the above modified example illustrated in FIG. 9. The third embodiment, however, is not limited to this. In the third embodiment, the purge system 23 that supplies the high-pressure air generated by the purge compressor 24 to the groove 21 through the communication holes 22 may be arranged in the same manner as the first embodiment. In the third embodiment, the suction system 26 may be arranged in the same manner as the second embodiment. In these cases, an effect that is the same as the effect described above can be obtained.

The axial compressor for the gas turbine is described above as an apparatus to which the invention is applicable. The invention, however, is not limited to this, and is applicable to an industrial axial compressor.

What is claimed is:

1. An axial compressor comprising:
a compressor body that compresses gas; and
a sprayer that is structurally configured to spray a droplet in suction gas of the compressor body so that the droplet is introduced into the compressor body and evaporates, the compressor body including
a casing,
a rotor rotatably arranged in the casing,
a plurality of rotor blades arranged on an outer circumferential side of the rotor,
a plurality of stator vanes arranged on an inner circumferential side of the casing, and
a groove arranged in an inner circumferential surface of the casing so as to be positioned around rotor blades arranged on a front stage side, wherein
a communication hole that communicates with the groove is formed in the casing,
a purge system for supplying high-pressure gas to the groove through the communication hole is provided so as to remove a liquid membrane within the groove, and
the communication hole extends to the groove and is inclined toward a downstream side with respect to an axial direction of the compressor body.

2. The axial compressor according to claim 1, wherein the communication hole extends to the groove and is inclined in a rotational direction of the rotor blades.

3. The axial compressor according to claim 1, wherein the purge system supplies high-pressure gas extracted by an extractor of the compressor body to the groove through the communication hole.

4. The axial compressor according to claim 1, wherein the purge system supplies high-pressure gas generated by a purge compressor to the groove through the communication hole.

5. The axial compressor according to claim 1, wherein the sprayer sprays a droplet of water in the suction gas of the compressor body.

6. A gas turbine comprising:
the axial compressor according to claim 1;
a combustor that mixes a fuel with compressed gas generated by the axial compressor and burns the fuel and the compressed gas; and
a turbine that is rotationally driven by combustion gas generated by the combustor.

7. The gas turbine according to claim 6, further comprising:
a humidifier that humidifies a compressed gas generated by the axial compressor; and
a recuperator that heats the compressed gas humidified by the humidifier using exhaust gas of the turbine;
wherein a combustor mixes the fuel with the compressed gas heated by the recuperator and burns the fuel and the compressed gas.

8. An axial compressor comprising:
a compressor body that compresses gas;
a sprayer that is structurally configured to spray a droplet in suction gas of the compressor body so that the droplet is introduced into the compressor body and evaporates, the compressor body including
a casing,
a rotor rotatably arranged in the casing,
a plurality of rotor blades arranged on an outer circumferential side of the rotor,
a plurality of stator vanes arranged on an inner circumferential side of the casing, and
a groove arranged in an inner circumferential surface of the casing so as to be positioned around rotor blades arranged on a front stage side, wherein
a communication hole that communicates with the groove is formed in the casing,
a purge system for supplying high-pressure gas to the groove through the communication hole is provided so as to remove a liquid membrane within the groove,
a suction system that is structurally configured to suction the liquid membrane within the groove through the communication hole; and
a control device that selectively executes purge control in which the high pressure gas is supplied from the purge system to the groove and suction control in which the liquid membrane within the groove is suctioned by the suction system.

9. The axial compressor according to claim 8, wherein the control device executes the purge control while a droplet is not sprayed in the suction gas of the compressor body, and executes the suction control while a droplet is sprayed in the suction gas of the compressor body.

10. The axial compressor according to claim 8, wherein the groove has a downstream-side side surface that is inclined toward a downstream side in a depth direction of the groove.

11. The axial compressor according to claim 8, wherein the suction system suctions the liquid membrane within the groove through the communication hole by suction force generated by a vacuum pump.

12. A gas turbine comprising:
the axial compressor according to claim 8,
a combustor that mixes a fuel with compressed gas generated by the axial compressor and burns the fuel and the compressed gas; and
a turbine that is rotationally driven by combustion gas generated by the combustor.

13. An axial compressor comprising:
a compressor body that compresses gas;
a sprayer that is structurally configured to spray a droplet in suction gas of the compressor body so that the droplet is introduced into the compressor body and evaporates, the compressor body including
a casing, a rotor rotatably arranged in the casing,
a plurality of rotor blades arranged on an outer circumferential side of the rotor,
a plurality of stator vanes arranged on an inner circumferential side of the casing, and
a groove arranged in an inner circumferential surface of the casing so as to be positioned around rotor blades arranged on a front stage side, wherein a communication hole that communicates with the groove is formed in the casing, and
a purge system for supplying high-pressure gas to the groove through the communication hole is provided so as to remove a liquid membrane within the groove;
a suction system that is structurally configured to suction the liquid membrane within the groove through the communication hole; and
a control device that selectively executes purge control in which the high pressure gas is supplied from the purge system to the groove and suction control in which the liquid membrane within the groove is suctioned by the suction system, wherein
the control device executes the purge control while a droplet is not sprayed in the suction gas of the compressor body, and executes the suction control while a droplet is sprayed in the suction gas of the compressor body.

* * * * *